April 12, 1966   A. HALPERT   3,245,670
AERATION CONNECTOR DEVICE
Filed Feb. 17, 1965

INVENTOR.
ABBY HALPERT
BY
ATTORNEYS.

United States Patent Office 3,245,670
Patented Apr. 12, 1966

3,245,670
AERATION CONNECTOR DEVICE
Abby Halpert, Brooklyn, N.Y., assignor to Halvin Products Company, Incorporated, Brooklyn, N.Y., a corporation of New York
Filed Feb. 17, 1965, Ser. No. 433,439
8 Claims. (Cl. 261—122)

This is a continuation-in-part of the subject matter disclosed in the prior and copending application Serial No. 197,008, filed May 23, 1962.

This invention relates generally to an aeration filtration system for aquariums. In particular, this invention relates to an improved aeration connector device utilized in a filtration system which is wholly on the outside of an aquarium tank.

Aeration systems utilizing an air stone have a tendency to clog, due to the formation of algae around the air stone, thereby hindering the efficiency of the system. It is desirable, therefore, that such filtration systems have an aeration connector device which may be interchanged to avoid clogging thereof.

Therefore, to overcome the foregoing and other difficulties of the prior art, the general object of this invention is to provide a new and better aquarium filtration system.

It is an object of this invention to provide an improved aquarium filtration and aeration system in which working components are wholly outside of the tank and interchangeable to facilitate maintenance thereof.

It is another object of this invention to interchangeably eliminate a clogged air stone from a filtration and aeration system.

A further object of this invention is to provide an aeration connector device which may be interchangeably connected to eliminate the clogging thereof.

Another object of this invention is to provide an aeration connector device which is economical to produce and which utilizes conventional, currently available materials that lend themselves to standard mass production manufacturing techniques.

Other objects will appear hereinafter.

Further and other objects and a fuller understanding of the invention may be had be referring to the following description and the claims taken in conjunction with the accompanying drawings, in which:

Figure 1:
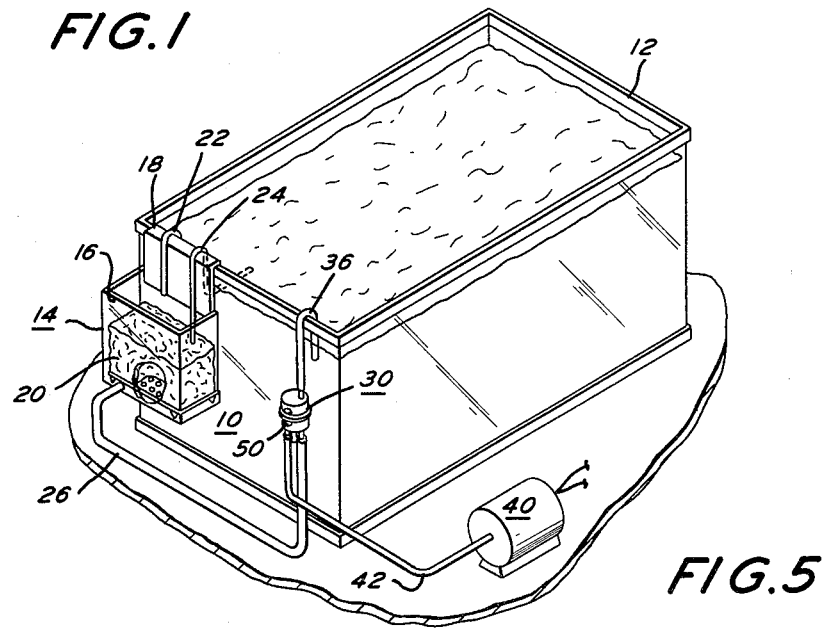
FIGURE 1 is a perspective view of an aquarium having an external aeration-filtering system thereon.
Figure 2:
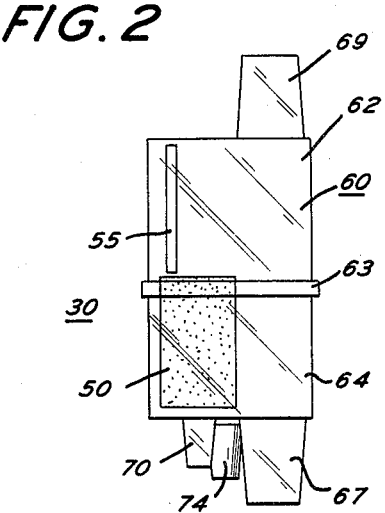
FIGURE 2 is a side elevation of the aeration connector device.

Referring now to the drawing(s) in detail, FIGURE 1 illustrates an aquarium tank 12 having an external filtering and aeration system generally indicated at 10. The filtering system 10 has a filter material 14 within the container 16 which hangs outside of the tank 12 by means of clamp 18. Intake siphon 24, between the tank 12 and container 16, provides a flow of water therebetween whenever a difference exists between the respective water levels. The water is filtered as it flows through material 14 and out of the bottom of the container 16 through a connecting conduit 27 to an aeration connector device 30. A return siphon 36 leads from the aeration connector device 30 back into the tank 12, thereby completing the circuit of system 10. A pump 40 provides pressurized air through the aerator conduit 42 to the aeration connector device 30 and an air stone 50 therein. The conventional overflow tube 22 is provided between tank 12 and container 16, as illustrated. Aeration of water within the aeration connector device 30 causes a displacement of aerated water up the return siphon 36 into tank 12. In this manner, the resultant displacement naturally causes a continuous siphoning action throughout the filter system 10.

A detailed construction of the aeration connector device 30 is best shown at FIGURES 2–6. The outer casing 60 of the device 30 is formed of a suitable transparent plastic, and has a generally cylindrical shape divided into upper and lower halves 62 and 64, which are conveniently joined at a collar 63 to enclose an aeration chamber 65 therein. A fastening agent may be utilized to provide a suitable strong and permanent joint within the collar 63. An inlet 66 and an outlet 68 to the chamber 65 are provided at opposite ends of the casing 60 by the tubular projections 67 and 69 therefrom, respectively. The tubular projections 67, 69 have a slight taper to facilitate connection with the elastic tubing of the connecting conduit 26 and the return siphon 36, respectively. An aeration nipple member 70 is an integral projection at the bottom end of the casing 60, the nipple 70 providing an aeration opening 71 therethrough.

Figures 4, 5, 6:
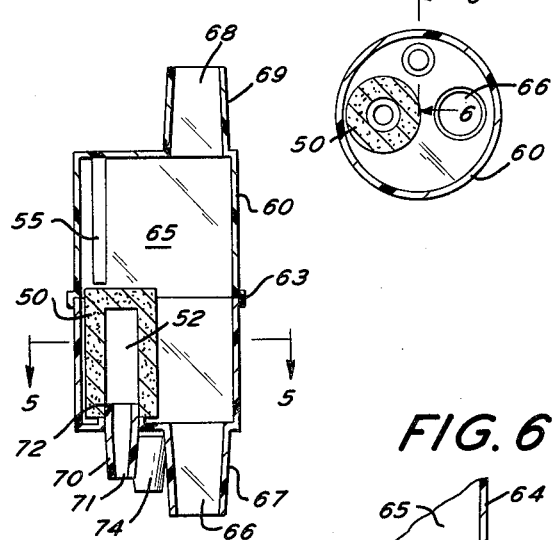
FIGURE 4 is a cross-sectional view of the device as taken along the line 4—4 in FIGURE 3.
FIGURE 5 is a cross-sectional view of the device looking in the direction 5—5 of FIGURE 4.
FIGURE 6 is partial cross-sectional view of FIGURE 5 taken along lines 6—6.
Figure 3:
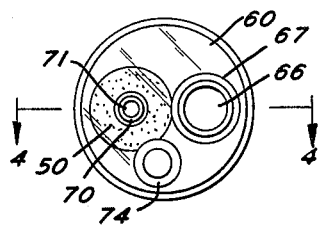
FIGURE 3 is an end view of FIGURE 2.

As shown in FIGURE 4, the opening 71 extends slightly into the chamber 65 through the short tubular projection 72 on member 70. The cross-sectional area of the opening 71 is substantially less than that of the intake 66 or the outlet 68.

The air stone 50 is a foraminous substance such as a porous stone of cup shape having a hollow bore 52 which tightly receives the tubular extension 72 as shown in FIGURE 4. The rod 55 extending within chamber 65 from the upper half 62 arrests movement of the stone 50 away from the tubular extension 72, which may be caused by air pressure through the opening 71. Rod 55 is integral with and fixedly secured to half 62.

A bypass nipple member 76 (FIGURE 6) is provided as an integral projection at the lower end of casing 60. Bypass nipple 76 is identical in size and shape to the aeration nipple 70, however, it is enclosed at blind end 77 as shown in FIGURE 6. Since the casing 60 is molded of a soft plastic, the blind end material 77 may be easily removed when desired as by cutting the same.

The enclosure member 74 is a cap of size and shape conforming to the nipples 70 and 76. The cap 74 is of a rubber or plastic material having a slight elasticity and suitable to enclose either of the nipples 70, 76 as desired. Cap 74 may be conveniently stored by placing it on the blind by-pass nipple 76, as shown in the drawings.

After a long period of use, the air stone 50 may tend to clog due to the formation of algae around the stone. As clogging progresses, the air pressure will build up within the hollow bore 52, however, less aeration will occur, thus hampering the efficiency of the system. The rod 55 prevents the stone from being blown off tubular projection 72. At this point, the present invention enables the aeration to bypass the air stone without the necessity of replacing the entire device 30. This may be easily accomplished by removing the material of blind end 77 from the bypass nipple 76, for instance by punching through the material of blind end 77 or by cutting off end portion of the nipple 76. The aeration conduit 42 is easily interchanged from nipple 70 to the bypass nipple 76 as they are of identical size and shape. The cap 74 is then placed on the nipple 70 to seal the opening 71 and prevent a back-flow therethrough. In this manner, efficient aeration filtration will continue through the system, although not quite at the same rate as would be effected through a clean aeration stone.

The present invention may be embodied in other specific forms without departing from the spirit or essential attributes thereof, and, accordingly, reference should be made to the appended claims, rather than to the foregoing specification as indicating the scope of the invention.

I claim:

1. An aeration device for connection within an aquarium filter system, comprising: a casing enclosing an aeration chamber and having an inlet and an outlet communicating with said chamber; an air stone within said casing; an aeration nipple member on said casing communicating with said chamber through said air stone; a closed bypass nipple member on said casing for direct communication to said chamber upon selective opening of the same; and a closure member adapted to be mounted on said aeration nipple for closure thereof when said bypass nipple is opened whereby flow of air may be interchanged for a direct admission of air into said chamber bypassing said stone.

2. An aeration device for connection within an aquarium filter system, comprising: a cylindrical casing enclosing an aeration chamber and having an inlet and an outlet at opposed ends communicating with said chamber; an air stone of volume substantially less than said chamber and securely mounted therein near one end of said casing; an aeration nipple member on said casing at said end communicating with said chamber through said air stone; a blind bypass nipple member on said casing for direct communication therethrough to said chamber upon selective opening of the same; and a closure member adapted to be mounted on said aeration nipple for closure thereof when said bypass nipple is open whereby a flow of air may be interchanged for a direct admission of air into said chamber bypassing said stone.

3. The device of claim 2 wherein said aeration and said bypass nipple are of identical size and shape for ease in interchange therebetween.

4. An aeration device for connection within an aquarium filter system, comprising: a casing with a cylindrical side and opposed ends enclosing an aeration chamber therein, said ends having an inlet and an outlet communicating with said chamber, a cylindrical air stone within said chamber and of substantially less volume than said chamber, said stone having a hollow bore open at an end thereof, an aeration nipple member at one end on said casing for communication therethrough with said chamber, said nipple including a tubular extension securely received within said bore of said air stone, a blind bypass nipple member on said casing for direct communication therethrough to said chamber upon selective opening thereof, said bypass nipple having an identical size and shape to said aeration nipple to facilitate an interchange therebetween, and a closure member adapted to be mounted on said aeration nipple for closure thereof when said bypass nipple is open whereby a flow of air may be interchanged for a direct admission of air into said chamber bypassing said stone.

5. The device of claim 4 wherein said casing is of a transparent material allowing an observation therethrough of said stone and aeration in said chamber.

6. An aeration device for connection within an aquarium filter system, comprising: a casing with a cylindrical side and opposed ends enclosing an aeration chamber therein, said ends having an inlet and an outlet aligned and radially disposed with respect to the longitudinal axis of said casing, a cylindrical air stone within said chamber and of substantially less volume than said chamber, said stone having a hollow bore open at an end thereof, an aeration nipple at one end of said casing communicating therethrough with said chamber, said aeration nipple having a tubular extension securely received within said hollow bore of said air stone, a retaining projection in a position within said chamber limiting movement of said air stone away from said tubular connection, a blind bypass nipple at one end on said casing for direct communication to said chamber upon selective opening thereof, said bypass nipple having a blind outer end and being of identical size and shape to said aeration nipple and a closure cap adapted to be mounted on said aeration nipple for closure thereof and adapted to be stored on said blind nipple.

7. An aeration device of claim 6 wherein said restraining projection is a rod-like member within said chamber projecting towards said stone from the other end of said casing.

8. An aeration device in accordance with claim 6, wherein said nipples are at the same end of said casing.

References Cited by the Examiner

UNITED STATES PATENTS

| 2,674,574 | 4/1954 | Pettas | 210—169 |
| 2,786,026 | 3/1957 | Stark | 210—169 |
| 2,877,898 | 3/1959 | Lacey | 210—169 |
| 3,199,678 | 8/1965 | Willinger | 210—220 X |

FOREIGN PATENTS

| 412,842 | 7/1934 | Great Britain. |

HARRY B. THORNTON, *Primary Examiner.*